United States Patent
Zhang et al.

(10) Patent No.: US 12,477,212 B2
(45) Date of Patent: Nov. 18, 2025

(54) SHOOTING CONTROL METHOD AND APPARATUS, AND ELECTRONIC DEVICE

(71) Applicant: VIVO MOBILE COMMUNICATION CO., LTD., Dongguan (CN)

(72) Inventors: Hong Zhang, Dongguan (CN); Zhijian Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 193 days.

(21) Appl. No.: 18/227,883

(22) Filed: Jul. 28, 2023

(65) Prior Publication Data
US 2023/0412913 A1    Dec. 21, 2023

Related U.S. Application Data

(63) Continuation of application No. PCT/CN2022/073935, filed on Jan. 26, 2022.

(30) Foreign Application Priority Data

Jan. 28, 2021 (CN) .......................... 202110121815.5

(51) Int. Cl.
*H04N 5/262* (2006.01)
*G06T 7/10* (2017.01)
(Continued)

(52) U.S. Cl.
CPC ............. *H04N 23/632* (2023.01); *G06T 7/10* (2017.01); *G06T 2207/10016* (2013.01)

(58) Field of Classification Search
CPC .. H04N 23/632; H04N 5/2621; H04N 5/2625; H04N 5/265; H04N 23/667;
(Continued)

(56) References Cited

U.S. PATENT DOCUMENTS 10,171,753 B2 * 1/2019 Wei ....................... H04N 23/70
11,516,402 B1 * 11/2022 Sandofsky .............. G06T 11/00
(Continued)

FOREIGN PATENT DOCUMENTS

CN    104079835 A    10/2014
CN    105072350 A    11/2015
(Continued)

OTHER PUBLICATIONS

Extended European Search Report issued in related European Application No. 22745257.0, mailed Jun. 19, 2024, 9 pages.
(Continued)

*Primary Examiner* — Ahmed A Berhan
(74) *Attorney, Agent, or Firm* — IPX PLLC

(57) ABSTRACT

A shooting control method and apparatus, and an electronic device are provided. The method includes: displaying a first interface in a process of shooting a target video, where the target video is a video of a light trail generation process, and the first interface includes a video preview window and at least one first control; receiving a first input performed by a user on a first target control, where the first target control is a control in the at least one first control; and adjusting a light trail generation parameter corresponding to the first target control in response to the first input, and updating an image in the video preview window based on the adjusted light trail generation parameter.

20 Claims, 11 Drawing Sheets

(51) Int. Cl.
  *H04N 5/265* (2006.01)
  *H04N 23/62* (2023.01)
  *H04N 23/63* (2023.01)
  *H04N 23/667* (2023.01)
  *H04N 23/80* (2023.01)

(58) Field of Classification Search
  CPC .......... H04N 23/80; H04N 23/62; G06T 7/10; G06T 2207/10016; G03B 30/00
  See application file for complete search history.

(56) References Cited

U.S. PATENT DOCUMENTS

| | | |
|---|---|---|
| 2013/0293758 A1 | 11/2013 | Chen |
| 2017/0134666 A1 | 5/2017 | Liu |
| 2017/0280064 A1 | 9/2017 | Weiqiang et al. |
| 2020/0120286 A1 | 4/2020 | Yasutomi |
| 2021/0409588 A1* | 12/2021 | Dong ........................ G06T 5/50 |

FOREIGN PATENT DOCUMENTS

| | | |
|---|---|---|
| CN | 106060384 A | 10/2016 |
| CN | 109688331 A | 4/2019 |
| CN | 110035141 A | 7/2019 |
| CN | 110995993 A | 4/2020 |
| CN | 112954201 A | 6/2021 |
| JP | 2012085254 A | 4/2012 |
| JP | 2015165642 A | 9/2015 |
| WO | 20150169165 A1 | 11/2015 |
| WO | 2018137264 A1 | 8/2018 |
| WO | 2020113534 A | 6/2020 |

OTHER PUBLICATIONS

Notice of Reason for Refusal issued in related Japanese Application No. 2023545373, mailed Oct. 1, 2024, 6 pages.
International Search Report issued in corresponding International Application No. PCT/CN2022/073935, mailed Apr. 15, 2022, 4 pages.
First Office Action issued in related Chinese Application No. 202110121815.5, mailed Mar. 7, 2022, 7 pages.

\* cited by examiner

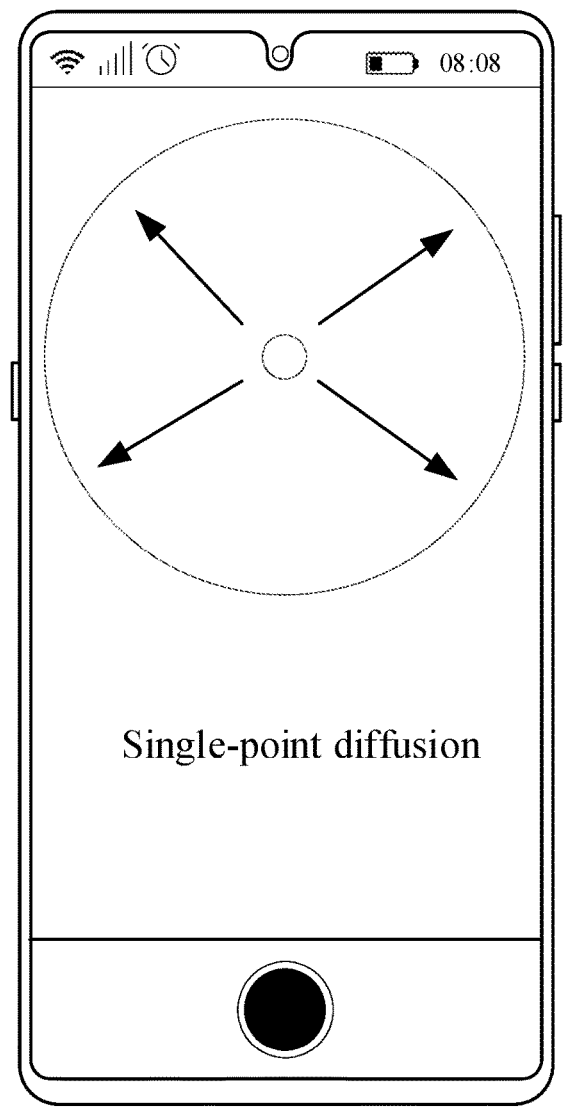 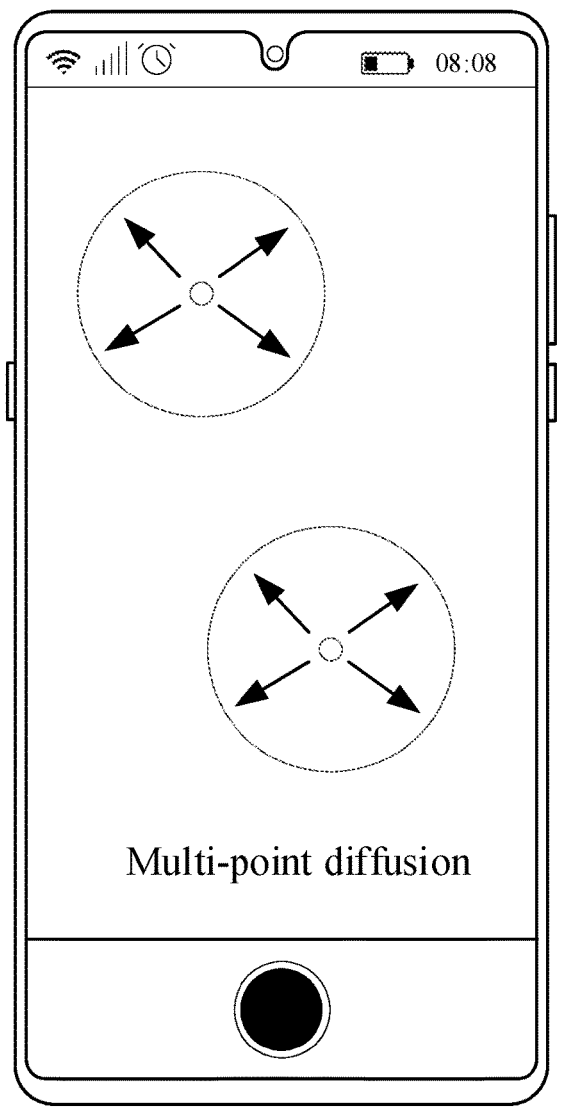
FIG. 5a
FIG. 5b

SHOOTING CONTROL METHOD AND APPARATUS, AND ELECTRONIC DEVICE

CROSS-REFERENCE TO RELATED APPLICATIONS

This application is a continuation of International Application No. PCT/CN2022/073935, filed Jan. 26, 2022, which claims priority to Chinese Patent Application No. 202110121815.5, filed Jan. 28, 2021. The entire contents of each of the above-referenced applications are expressly incorporated herein by reference.

TECHNICAL FIELD

This application relates to the field of communication technologies, and specifically relates to a shooting control method and apparatus, and an electronic device.

BACKGROUND

With rapid development of communication technologies, a shooting function of an electronic device is increasingly powerful, for example, a shooting function in a light stream shutter mode.

In the light stream shutter mode, moving tracks of light and shadow and flowing water may be captured based on different light rays and shooting objects. The light stream shutter mode is generally used to shoot specific people and regular dynamic scenes, such as a starry sky, a waterfall, a stream, and a vehicle on the road. In addition, shooting in the light stream shutter mode may generate a strip-like dynamic effect. A streamer shutter video is recording a shooting process of the entire light stream shutter mode as a video.

However, in a process of shooting a streamer shutter video, because a light trail generation parameter is fixed, a shooting form is single, and a user requirement cannot be met.

SUMMARY

Embodiments of this application provide a shooting control method and apparatus, and an electronic device.

According to a first aspect, embodiments of this application provide a shooting control method. The method includes: displaying a first interface in a process of shooting a target video, where the target video is a video of a light trail generation process, and the first interface includes a video preview window and at least one first control; receiving a first input performed by a user on a first target control, where the first target control is a control in the at least one first control; and adjusting a light trail generation parameter corresponding to the first target control in response to the first input, and updating an image in the video preview window based on the adjusted light trail generation parameter.

According to a second aspect, embodiments of this application provide a shooting control apparatus. The apparatus includes a display module, a receiving module, and an updating module, where the display module is configured to display a first interface in a process of shooting a target video, where the target video is a video of a light trail generation process, and the first interface includes a video preview window and at least one first control; the receiving module is configured to receive a first input performed by a user on a first target control, where the first target control is a control in the at least one first control; and the updating module is configured to: adjust a light trail generation parameter corresponding to the first target control in response to the first input, and update an image in the video preview window based on the adjusted light trail generation parameter.

According to a third aspect, embodiments of this application provide an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, embodiments of this application provide a readable storage medium. The readable storage medium stores a program or an instruction, and when the program or the instruction is executed by a processor, the steps of the method in the first aspect are implemented.

According to a fifth aspect, embodiments of this application provide a chip. The chip includes a processor and a communication interface, the communication interface is coupled to the processor, and the processor is configured to run a program or an instruction to implement the method in the first aspect.

In the embodiments of this application, a first interface may be displayed in a process of shooting a target video, where the target video is a video of a light trail generation process, and the first interface includes a video preview window and at least one first control; a first input performed by a user on a first target control is received, where the first target control is a control in the at least one first control; and a light trail generation parameter corresponding to the first target control is adjusted in response to the first input, and an image in the video preview window is updated based on the adjusted light trail generation parameter. In this solution, in the process of shooting the video of the light trail generation process, the user may adjust the light trail generation parameter through the first input on the first target control (a control in the at least one first control, where each first control is used to adjust a light trail generation parameter), and update the image in the video preview window. In this way, in a shooting process, the user can change a generation parameter (that is, adjust a shooting form) in a light trail generation process through an input, so that shooting forms are diversified, and a problem that a shooting form is single because a light trail generation parameter is fixed in the related art can be resolved.

BRIEF DESCRIPTION OF DRAWINGS

FIG. 5a and FIG. 5b are fourth schematic diagrams of an interface of a shooting control method according to an embodiment of this application;

DETAILED DESCRIPTION

Figure 1:
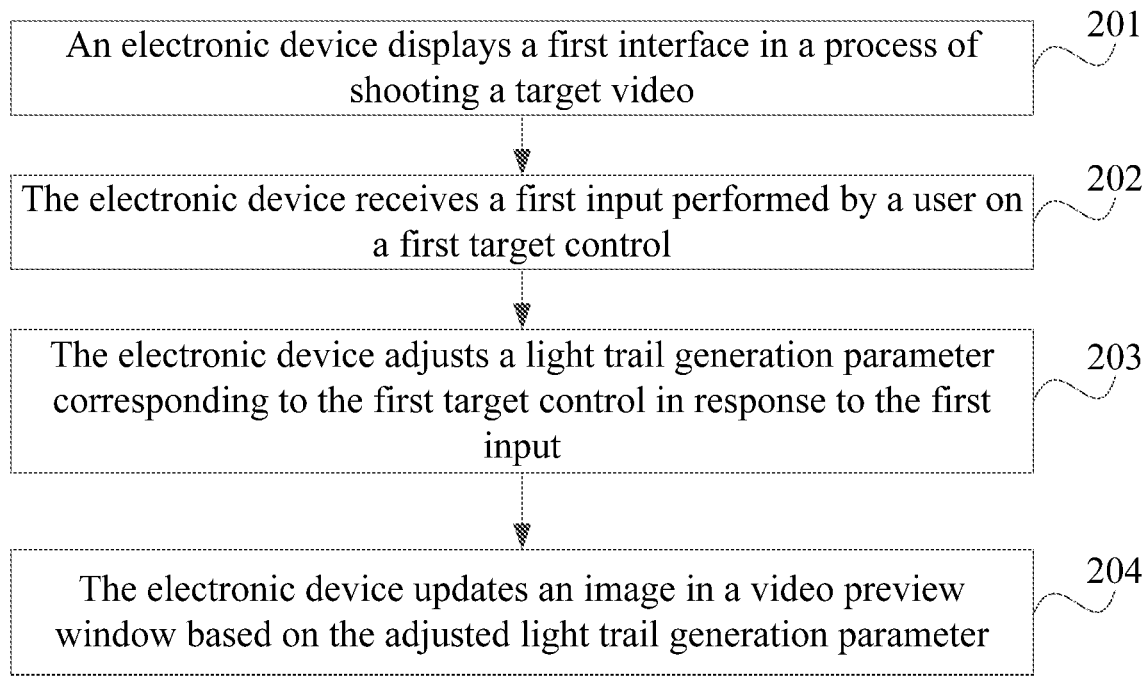
FIG. 1 is a flowchart of a shooting control method according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

In the embodiments of this application, the word such as "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word "example" or "for example" is intended to present a concept in a specific manner.

In the descriptions of the embodiments of this application, unless otherwise stated, "a plurality of" means two or more, for example, a plurality of processing units mean two or more processing units, and a plurality of elements mean two or more elements.

With reference to the accompanying drawings, a shooting control method and apparatus, and an electronic device provided in this application are described in detail by using embodiments and application scenes.

The shooting control method provided in embodiments of this application may be applied to a scene of shooting a video of a light trail generation process (shooting a streamer shutter video). In this solution, in a process of shooting the video of the light trail generation process, a user may adjust a light trail generation parameter through a first input on a first target control (a control in at least one first control, where each first control is used to adjust a light trail generation parameter), and update an image in a video preview window. In this way, in a shooting process, the user can change a generation parameter (that is, adjust a shooting form) in a light trail generation process through an input, so that shooting forms are diversified, and a problem that a shooting form is single because a light trail generation parameter is fixed in the related art can be resolved.

As shown in FIG. 1, an embodiment of this application provides a shooting control method. The following uses an example in which an execution body is an electronic device to illustrate the shooting control method provided in embodiments of this application. The method may include the following step 201 to step 204.

Step 201: An electronic device displays a first interface in a process of shooting a target video.

The target video is a video of a light trail generation process, the first interface includes a video preview window and at least one first control, and each first control is used to adjust a light trail generation parameter.

It can be understood that in embodiments of this application, the video preview window is used to display a preview image (which may also be referred to as a preview picture) shot in real time in the process of shooting the target video.

It can be understood that in embodiments of this application, each first control may be a control in a form of a progress bar, a control in a form of a key, or a control in another form. This is not limited in embodiments of this application.

It can be understood that in embodiments of this application, the light trail generation parameter may include at least one of the following: a quantity of simultaneously generated light trails, and a generation speed of a light trail in a generation state, and may further include another generation parameter. This is not limited in embodiments of this application.

In some embodiments, the at least one control includes at least one of the following: a quantity control and a speed control. The quantity control is used to adjust a quantity of simultaneously generated light trails, and the speed control is used to adjust a generation speed of a light trail in a generation state.

It can be understood that the quantity control may also be referred to as a "simultaneously generated quantity control", and the speed control may also be referred to as an "individually generated speed control". This is not limited in embodiments of this application.

It can be understood that in the process of shooting the target video, if a light trail generation parameter is not controlled, the quantity of simultaneously generated light trails is not limited, because the quantity of simultaneously generated light trails is determined based on an actual shooting scene. In embodiments of this application, a generation speed of a single light trail is controlled by controlling a frame rate of the target video.

Step 202: The electronic device receives a first input performed by a user on a first target control.

The first target control is a control in the at least one first control.

In some embodiments, the first input may be a tap input performed by the user on the first target control, or may be a drag input performed by the user on the first target control, or may be another feasibility input. This may be determined based on an actual use situation, and is not limited in embodiments of this application.

For example, the tap input may be an input of any number of taps such as a single-tap input or a double-tap input, or may be a short-press input or a touch and hold input. The drag input may be a drag input in any direction, such as an upward drag input, a downward drag input, a leftward drag input, or a rightward drag input.

Step 203: The electronic device adjusts a light trail generation parameter corresponding to the first target control in response to the first input.

For example, if the first target control is the quantity control, the electronic device adjusts the quantity of simultaneously generated light trails in response to the first input. If the first target control is the speed control, the electronic device adjusts the light trail generation speed in response to the first input.

Step 204: The electronic device updates an image in the video preview window based on the adjusted light trail generation parameter.

Figure 2:
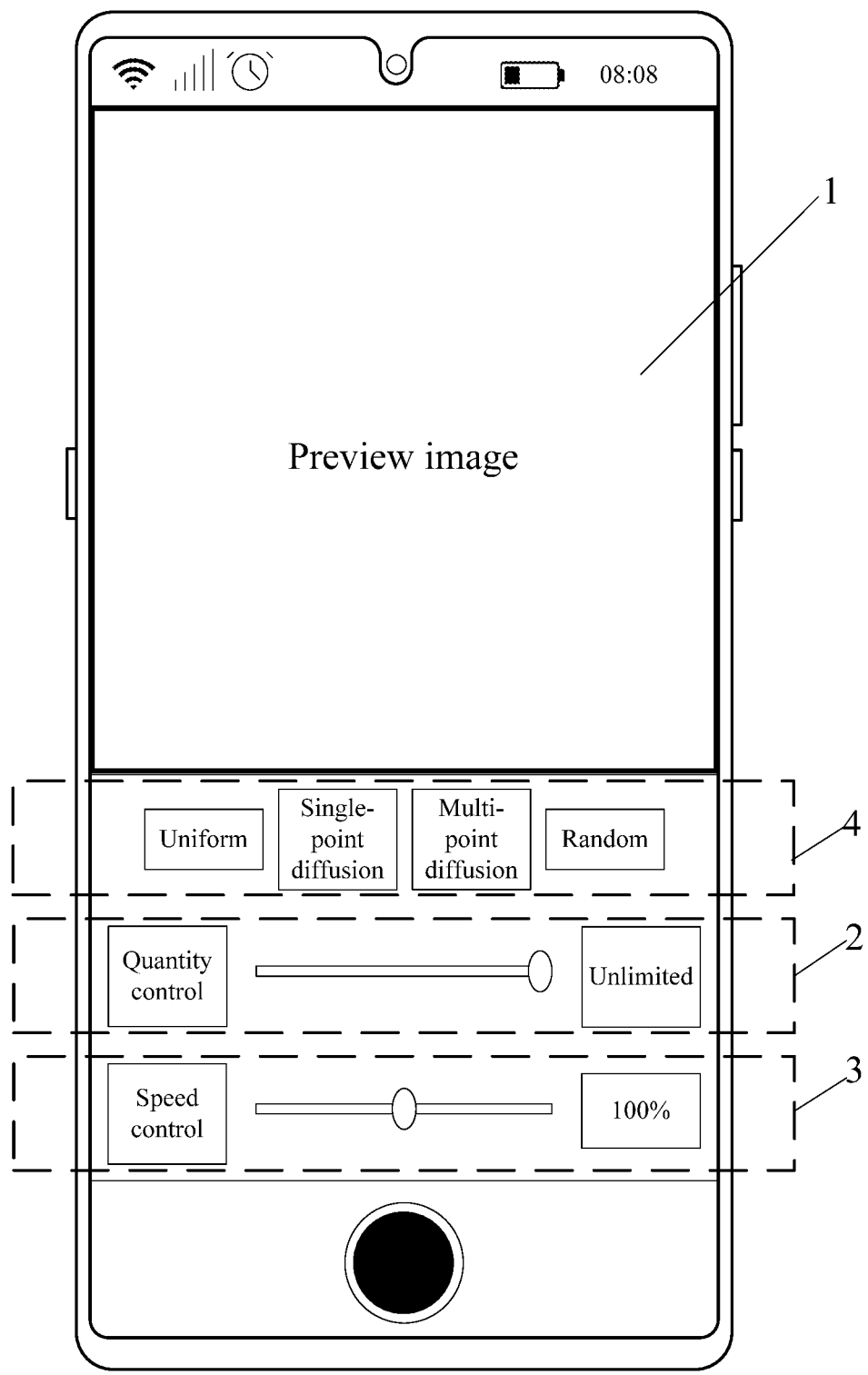
FIG. 2 is a first schematic diagram of an interface of a shooting control method according to an embodiment of this application.

For example, the user opens a camera application, and taps a "light stream shutter mode" option to enter a streamer shutter video shooting mode. As shown in FIG. 2, an interface (that is, a first interface) of the streamer shutter video shooting mode is displayed, where a mark "1" indicates a video preview window, and a preview image currently shot is displayed in the video preview window; a mark "2" indicates a quantity control, and currently the quantity control is "unlimited"; and a mark "3" indicates a speed control, and currently the speed control is "50%". After the user taps a "shooting" option, the electronic device shoots a streamer shutter video (a target video) based on a light trail generation parameter specified by the user. If the quantity control and the speed control are respectively unlimited and 100% (that is, the user does not perform setting), no special processing is performed, and a shot image is directly displayed in the video preview window. If the user sets a light trail generation parameter by using at least one of the quantity control and the speed control, the electronic device displays a processed image in the video preview window after performing corresponding processing on the shot image.

In embodiments of this application, a first interface may be displayed in a process of shooting a target video, where the target video is a video of a light trail generation process, and the first interface includes a video preview window and at least one first control; a first input performed by a user on a first target control is received, where the first target control is a control in the at least one first control; and a light trail generation parameter corresponding to the first target control is adjusted in response to the first input, and an image in the video preview window is updated based on the adjusted light trail generation parameter. In this solution, in the process of shooting the video of the light trail generation process, the user may adjust the light trail generation parameter through the first input on the first target control (a control in the at least one first control, where each first control is used to adjust a light trail generation parameter), and update the image in the video preview window. In this way, in a shooting process, the user can change a generation parameter (that is, adjust a shooting form) in a light trail generation process through an input, so that shooting forms are diversified, and a problem that a shooting form is single because a light trail generation parameter is fixed in the related art can be resolved.

In some embodiments, the first target control is a quantity control in the at least one first control, and the light trail generation parameter is a quantity of simultaneously generated light trails; a first image is displayed in the video preview window before the first input; and the foregoing step 204 may be implemented by the following step 204*a*.

Step 204*a*: The electronic device updates the first image in the video preview window to a second image based on the first input.

The electronic device updates the first image in the video preview window to a third image in a case that the first input is not received. Compared with the first image, lengths of N light trails in the second image are increased (that is, it indicates that the quantity of simultaneously generated light trails is N), and compared with the first image, lengths of M light trails in the third image are increased (that is, it indicates that the quantity of simultaneously generated light trails is M), where N and M are positive integers, and N and M are different.

It can be understood that in embodiments of this application, before the first input, if a quantity of simultaneously generated light trails in a video clip shot in a period of time is M, the quantity of simultaneously generated light trails in the shot video clip (for example, the third image) is M in a case that the first input is not received. The first input is an input performed by the user on the quantity control to trigger the electronic device to adjust a quantity of simultaneously generated light trails in a subsequently shot video clip from M to N. The electronic device obtains the second image in response to the first input, and updates the first image in the video preview window to the second image.

It can be understood that in embodiments of this application, in addition to the N light trails, the second image may include at least one light trail whose length stops increasing, and in addition to the M light trails, the third image may include at least one light trail whose length stops increasing. This is not limited in embodiments of this application.

In some embodiments, the N light trails and the M light trails may be completely different, or may be partially the same and partially different. If N is less than M, the N light trails may be light trails in the M light trails; or if N is greater than M, the N light trails may include the M light trails. This may be determined based on an actual situation, and is not limited in embodiments of this application.

In some embodiments, after the first input, the user may specify which light trails in the second image are the N light trails through an input (for example, an input of specifying specific light trails or an input of specifying light trails in a specific region in a shooting field of view, which is not limited in embodiments of this application).

In some embodiments, the user adjusts the quantity of simultaneously generated light trails in the video clip in the period of time through the first input, so that shooting forms can be diversified.

In some embodiments, in the process of shooting the target video, because a shooting scene does not change, an actually shot light trail generation image does not change. In this application, after processing corresponding to the first input is performed on the actually shot image, an image whose generation parameter changes (hereinafter referred to as a processed image) may be obtained, the processed image is displayed in the video preview window, and the target video is obtained based on the processed image.

For example, before the foregoing step 204*a*, the shooting control method provided in embodiments of this application may further include the following step 10 to step 13.

Step 10: The electronic device obtains an image 1 (the image 1 is an actually shot light trail generation image).

Step 11: The electronic device performs image segmentation processing on the image 1 to obtain S light trail images 1, where each light trail image 1 is an image of a light trail (a light trail in the image 1) whose length is increased and that is corresponding to a light trail in an actually shot previous frame of image (a light trail image in an actual scene), where S is a positive integer greater than or equal to P, and P is a larger value in M and N.

Step 12: The electronic device performs image segmentation processing on the first image to obtain an intermediate image 1, where the intermediate image 1 is an image obtained after N light trail images 2 are segmented from the first image, and each light trail image 2 is an image of a light trail corresponding to one of the N light trails in the first image.

Step 13: The electronic device performs image composition processing on the intermediate image 1 and the N light trail images 3 to obtain the second image.

In some embodiments, each light trail image 3 in the N light trail images 3 is a light trail image with a shortest light trail length in a light trail image 1 corresponding to a light trail 1 in the S light trail images 1 and a previously saved light trail image set corresponding to the light trail 1 (if there is a previously saved light trail image in the N light trail images 3, the saved light trail image is deleted from a storage region after step 13), where the light trail 1 is one light trail in the N light trails, and different light trail images 3 correspond to different light trails in the N light trails.

In some embodiments, each of the N light trail images 3 is any light trail image in a light trail image 1 corresponding to a light trail 1 in the S light trail images 1 and a previously saved light trail image set corresponding to the light trail 1.

The light trail 1 is a light trail corresponding to each light trail image 3 in the N light trails. That is, the light trail 1 is one of the N light trails, and different light trail images 3 correspond to different light trails in the N light trails.

It should be noted that in embodiments of this application, for each light trail whose generation parameter is controlled (generation stops), there is a corresponding light trail image set. For a light trail whose generation parameter is not controlled, there may be a light trail image set (the light trail image set is empty), or there may be no light trail image set. A light trail image set may be initially generated during shooting of the target video, or may be generated only in a case that a generation parameter of a corresponding light trail is controlled. This is not limited in embodiments of this application.

The light trail image set may be a set, or may not be a set (only a separate storage region). This is not limited in embodiments of this application.

After step 13, the shooting control method provided in embodiments of this application may further include the following step 14.

Step 14: The electronic device saves a light trail image 1 other than a light trail image 1 that is the same as a light trail image in the N light trail images 3 in the S light trail images 1.

For example, it is assumed that a shooting scene of the target video actually includes four light trails: a light trail a, a light trail b, a light trail c, and a light trail d, respectively. That is, in a case that the shooting control method provided in embodiments of this application is not implemented, the target video is a process generation video of the four light trails. In an initial video clip 1 of the target video, the four light trails (the light trail a, the light trail b, the light trail c, and the light trail d) are simultaneously generated. Then, an input 1 performed by the user to reduce the quantity of simultaneously generated light trails from 4 to 2 (the quantity control is adjusted from 4 to 2) is received. In a next video clip 2, two light trails (the light trail a and the light trail b) are simultaneously generated, and generation of two light trails (the light trail c and the light trail d) stops when the input 1 is received. In a frame-by-frame light trail generation image that is actually shot in this process, a light trail image corresponding to the light trail c is segmented and is saved in a light trail image set c frame by frame, and a light trail image corresponding to the light trail d is segmented and is saved in a light trail image set d frame by frame. After a period of time, an input 2 performed by the user to increase the quantity of simultaneously generated light trails from 2 to 3 (the quantity control is adjusted from 2 to 3) is received. In a next video clip 3, two light trails (the light trail a and the light trail b) continue to be simultaneously generated, and one light trail (the light trail c) changes from stopping being generated to continuing being generated. In some embodiments, a shortest light trail image is obtained from the light trail image set c frame by frame (the light trail image is deleted from the light trail image set c) to replace a light trail image corresponding to the light trail c in the frame-by-frame light trail generation image that is actually shot (the replaced light trail image is saved in the light trail image set c) (that is, a frame-by-frame shortest light trail image X obtained from the light trail image set c is exchanged with a light trail image y corresponding to the light trail c in the frame-by-frame light trail generation image that is actually shot). One light trail (the light trail d) continues stopping being generated, and in the frame-by-frame light trail generation image that is actually shot in this process, a light trail image corresponding to the light trail d is segmented and is saved in the light trail image set d. After another period of time, an input 3 performed by the user to reduce the quantity of simultaneously generated light trails from 3 to 1 (the quantity control is adjusted from 3 to 1) is received. In a next video clip 4, one light trail (the light trail a) continues being generated, two light trails (the light trail b and the light trail c) change from being generated to stopping being generated, and one light trail (the light trail d) continues stopping being generated. In a frame-by-frame light trail generation image that is actually shot in this process, a light trail image corresponding to the light trail b is segmented and is saved in a light trail image set b frame by frame, a light trail image corresponding to the light trail c is segmented and is saved in the light trail image set c frame by frame, and a light trail image corresponding to the light trail d is segmented and is saved in the light trail image set d frame by frame.

It should be noted that in embodiments of this application, in a case that another input (an input on any first control or an input of stopping shooting the target video) is not received after the first input, the electronic device cyclically performs the foregoing step 10 to step 14 to obtain a video clip after the first input (in the target video).

In some embodiments, after processing corresponding to the first input is performed on an obtained image (the third image) in a case that the first input is not received, an image whose generation parameter changes may be obtained (a processed image, namely, the second image), the processed image is displayed in the video preview window, and the target video is obtained based on the processed image.

For example, before the foregoing step 204a, the shooting control method provided in embodiments of this application may further include the following step 204b to step 204c.

Step 204b: The electronic device obtains the third image.

Step 204c: The electronic device performs target processing on the third image to obtain the second image.

The target processing is processing corresponding to the first input.

In embodiments of this application, the target processing includes image segmentation processing and image composition processing, and may further include another image processing method. This may be determined based on an actual use requirement, and is not limited in embodiments of this application.

It can be understood that if the electronic device does not receive another input on any first control before the first input, the third image is an actual light trail generation image shot by the electronic device based on a shooting scene. If the electronic device receives another input on any first control before the first input, the third image may be the foregoing actual light trail generation image, or may be an image obtained after the actual light trail generation image is processing (processing corresponding to the another input).

It should be noted that in embodiments of this application, in a case that another input (an input on any first control or an input of stopping shooting the target video) is not received after the first input, the electronic device cyclically performs the foregoing step 204b to step 204c to obtain a video clip after the first input (in the target video).

In some embodiments, the third image is obtained, and target processing is performed on the third image to obtain the second image, so that a light trail generation image required by the user can be obtained, and further a light trail generation video required by the user can be obtained.

In some embodiments, in a case that N is less than M, the M light trails include the N light trails (that is, generation of a part of light trails in the original light trails that are simultaneously generated is controlled to stop). The foregoing step 204c may be implemented by the following step 101 to step 103.

Step 101: The electronic device performs image segmentation processing on the third image to obtain a first intermediate image.

The first intermediate image is an image obtained after M−N first light trail images are segmented from the third image, and each first light trail image is an image of one light trail other than the N light trails in the M light trails.

Step 102: The electronic device performs image segmentation processing on the first image to obtain M−N second light trail images.

Each second light trail image is an image of one light trail other than the N light trails in the M light trails.

Step 103: The electronic device performs image composition processing on the first intermediate image and the M−N second light trail images to obtain the second image.

It should be noted that in embodiments of this application, for the foregoing image segmentation processing, image composition processing, and the like, refer to a related image segmentation technology, an image composition technology, and the like (which is the same below). Details are not described herein again.

In some embodiments, the foregoing step 101 may be implemented by the following step 101a. After step 101a, the shooting control method provided in embodiments of this application may further include the following step 104.

Step 101a: The electronic device performs image segmentation processing on the third image to obtain the first intermediate image and the M−N first light trail images.

Step 104: The electronic device saves the M−N first light trail images.

Figure 3:
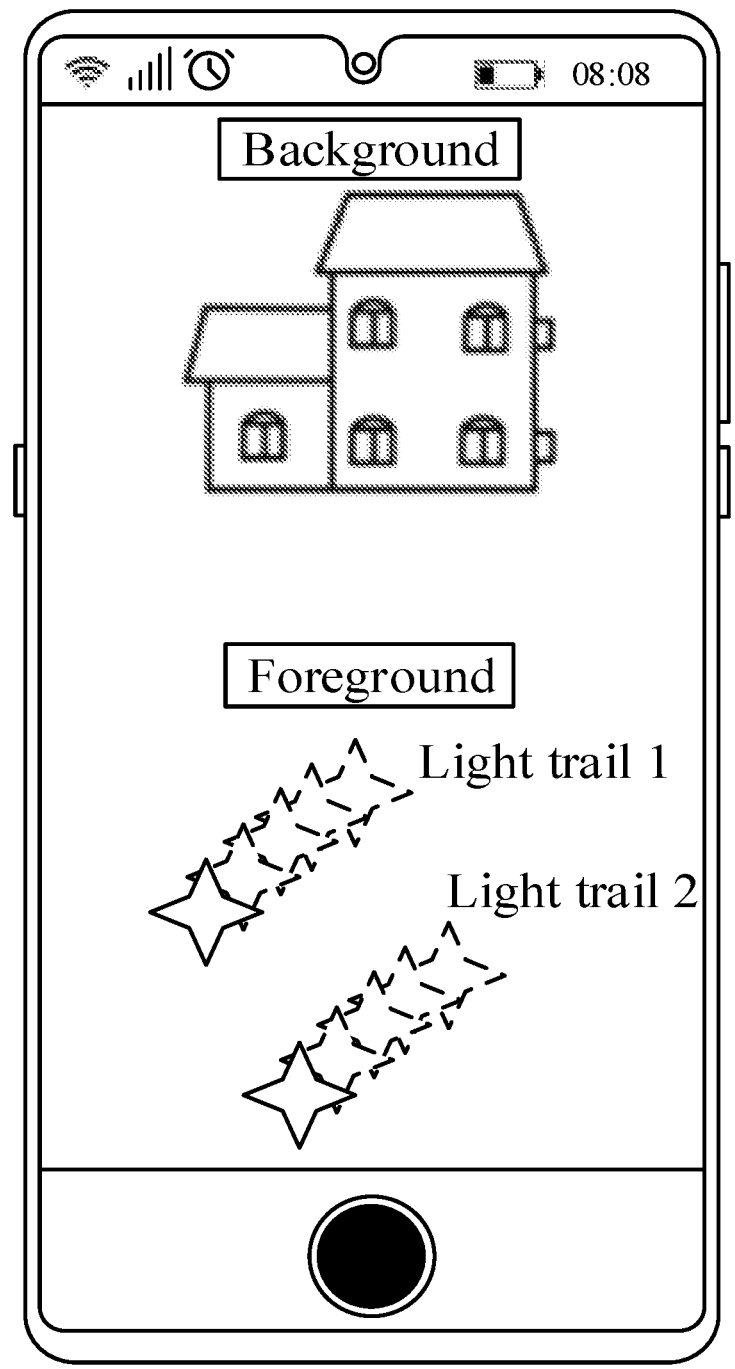
FIG. 3 is a second schematic diagram of an interface of a shooting control method according to an embodiment of this application.
Figure 4:
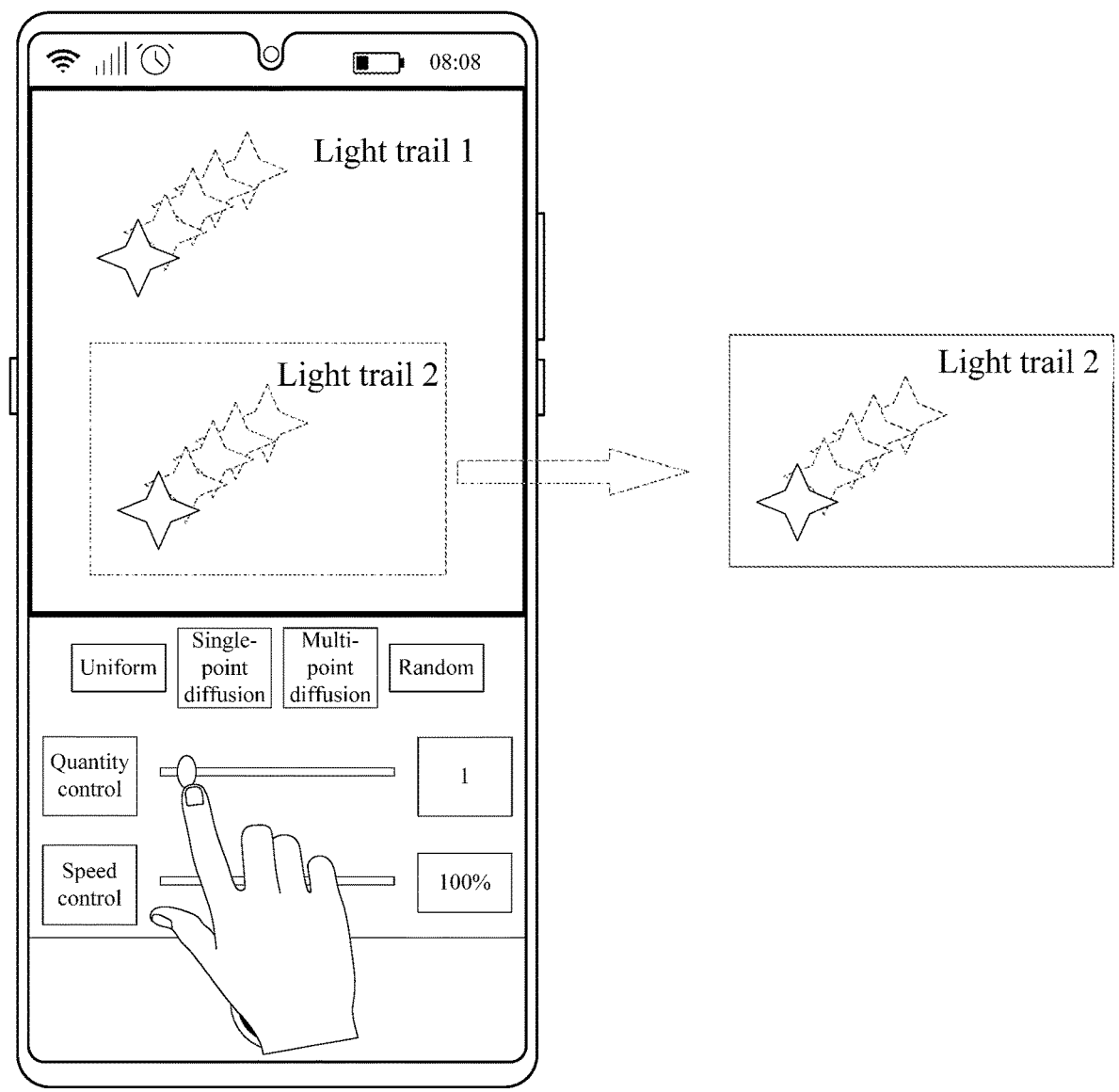
FIG. 4 is a third schematic diagram of an interface of a shooting control method according to an embodiment of this application.

It can be understood that, the foregoing step 101 to step 104 may be an input that is performed by the user to adjust the quantity control to reduce the quantity of simultaneously generated light trails and that is received after the user taps the "shooting" option to start shooting the target video (or an input that is performed by the user to adjust the quantity control to reduce the quantity of simultaneously generated light trails and that is received again after the user adjusts the quantity control for a plurality of times in the process of shooting the target video). In response to the input, the electronic device extracts, by using an image segmentation technology, an image of reduced light trails (light trails other than the N light trails in the M light trails) that are (actually) being generated (as shown in FIG. 3, a background and a foreground of an image may be segmented or a light trail 1 and a light trail 2 in the foreground may be segmented by using the image segmentation technology. As shown in FIG. 4, the light trail 2 is segmented and saved), and then save the extracted image frame by frame for subsequent processing. Generation of the reduced light trails that are (actually) being generated stops in the video preview window.

It can be understood that in a case that the user reduces the quantity of simultaneously generated light trails, if the quantity of light trails that are being generated is greater than the quantity of simultaneously generated light trails specified by the user, the image displayed in the video preview window includes only the simultaneously generated light trails specified by the user. In this case, an image of extra light trails may be first segmented and saved. Subsequently, when the user specifies that a part or all of the extra light trails continue to be generated, the electronic device may extract, from a storage region, the previously saved light trail image corresponding to the part or all of the light trails, and then compose the light trail image into a preview image to be displayed in the video preview window, to reflect a generation process of the part or all of the light trails.

In some embodiments, in a case that N is greater than M, the N light trails include the M light trails (that is, in a case that the original M light trails continue to be generated, some light trails whose generation has been previously controlled to stop are added, and generation is resumed). The foregoing step 204c may be implemented by the following step 105 to step 106.

Step 105: The electronic device obtains N−M third light trail images.

Each third light trail image is a light trail image with a shortest light trail length that is in a light trail image set corresponding to one first target light trail and that is saved before the first input, and the one first target light trail is one of N−M light trails other than the M light trails in the N light trails.

It can be understood that different third light trail images correspond to different first target light trails.

In embodiments of this application, for description of the light trail image set, refer to the related description of the light trail image set in step 13. Details are not described herein again.

Step 106: The electronic device performs image composition processing on the third image and the N−M third light trail images to obtain the second image.

In some embodiments, that the third image may not include a light trail or may include a light trail other than the M light trails can be understood as that: the third image does not include the N−M light trails other than the M light trails (the third image does not include the N−M light trails), the third image includes the N−M light trails other than the M light trails (the third image includes the N−M light trails), or the third image includes a part of the N−M light trails other than the M light trails (the third image includes a part of the N−M light trails). For a light trail that is not in the third image in the N−M light trails, composition processing in step 106 may be inserting a third light trail image corresponding to the light trail that is not in the third image into a corresponding position in the third image. For a light trail that is in the third image in the N−M light trails, composition processing in step 106 may be replacing a third light trail image corresponding to the light trail that is in the third image with a light trail image at a corresponding position in the third image.

In some embodiments, in a case that the third image includes the N−M light trails, step 106 may be implemented by the following step 106a to step 106b.

Step 106a: The electronic device performs image segmentation processing on the third image to obtain a second intermediate image.

The second intermediate image is an image obtained after N−M fifth light trail images are segmented from the third image, and each fifth light trail image is an image of one light trail other than the M light trails in the N light trails.

It can be understood that one fifth light trail image corresponds to one third light trail image, and different fifth light trail images correspond to different third light trail images. A length of a light trail in each light trail image in the light trail image set is greater than a length of a light trail in a corresponding fifth light trail image. The fifth light trail image is an image of one light trail whose length is not increased in the third image, and all saved light trail images in the light trail image set are light trail images whose actual lengths are increased but that are not displayed in the video preview window.

Step 106b: The electronic device performs image composition processing on the second intermediate image and the N−M third light trail images to obtain the second image.

It can be understood that the foregoing step 105 to step 106 are performed after the user decreases the quantity of simultaneously generated light trails and a specified quantity of light trail images are buffered and then the user increases the quantity of simultaneously generated light trails (generation of a part or all of light trails that are previously controlled to stop being generated is resumed). In this case, because there are buffered light trails, after the quantity of simultaneously generated light trails is increased, a real-time generated image of the part or all of the light trails may be segmented and saved, and then a previously saved corresponding light trail image is extracted and composed into a preview image to be displayed in the video preview window, that is, a large quantity of previously buffered light trail images are displayed in the video preview window.

In some embodiments, the first interface further includes at least one second control. Each second control is used to determine a distribution mode of the N−M third light trail images. Before the foregoing step 105, the shooting control method provided in embodiments of this application may further include the following step 107 to step 108. The foregoing step 105 may be implemented by the following step 105a.

Step 107: The electronic device receives a second input performed by the user on a second target control.

The second target control is a control in the at least one second control.

In some embodiments, the at least one second control includes at least one of the following: a single-point diffusion distribution control, a multi-point diffusion distribution control, a uniform distribution control, and a random distribution control.

For example, the at least one second control includes a single-point diffusion distribution control, a multi-point diffusion distribution control, a uniform distribution control, and a random distribution control that are respectively corresponding to "single-point diffusion", "multi-point diffusion", "uniform", and "random" that are indicated by a mark "4" in FIG. 2.

Figure 6A:
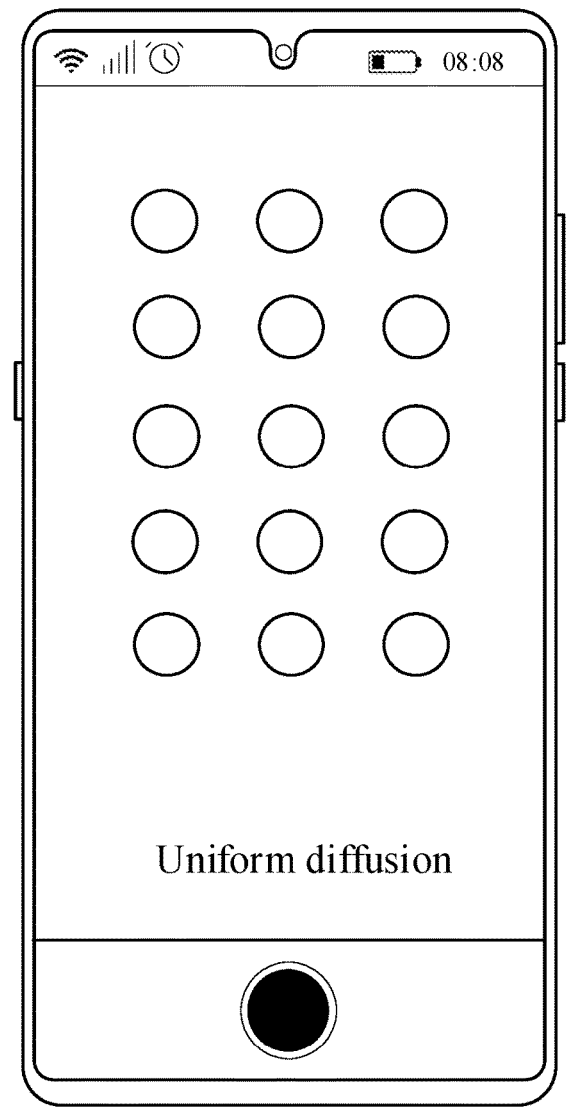
FIG. 6a and FIG. 6b are fifth schematic diagrams of an interface of a shooting control method according to an embodiment of this application.
Figure 6B:
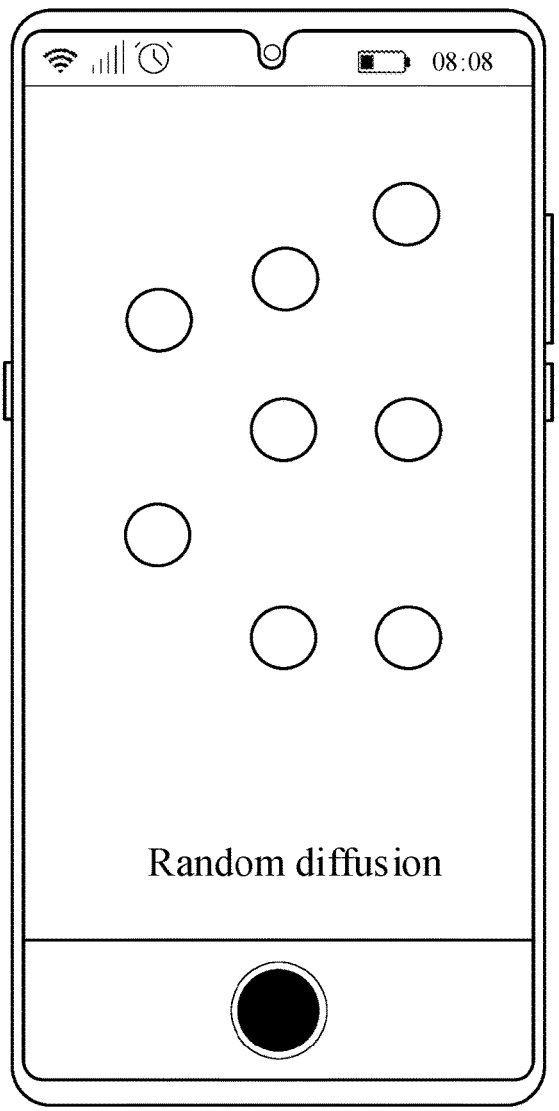

It can be understood that in embodiments of this application, as shown in FIG. 5a, a single-point diffusion distribution control is used to control light trails whose generation resume to be distributed around one central point (that is, a light trail near the central point is preferentially selected for generation resumption, and then a light trail far away from the central point is selected for generation resumption). As shown in FIG. 5b, a multi-point diffusion distribution control is used to control light trails whose generation resume to be separately distributed around a plurality of central points (that is, any light trail near two central points is preferentially selected for generation resumption, and then any light trail away from the two central points is selected for generation resumption). As shown in in FIG. 6a, a uniform distribution control is used to control light trails whose generation resume to be uniformly distributed in an image, instead of being distributed on any point or a plurality of points. As shown in in FIG. 6b, a random distribution control is used to control light trails whose generation resume to be randomly distributed in an image, without limiting a distribution form.

Step 108: In response to the second input, the electronic device determines that a distribution mode of the N−M third light trail images is a target mode.

Step 105a: In response to the second input, the electronic device obtains N−M fourth light trail images whose distribution mode is the target mode from the K fourth light trail images as the N−M third light trail images.

Each fourth light trail image is a light trail image with a shortest light trail length that is in a light trail image set corresponding to one second target light trail and that is saved before the first input, and the one second target light trail is one light trail other than the M light trails, where K is a positive integer greater than N−M.

It can be understood that different fourth light trail images correspond to different second target light trails.

Figure 7:
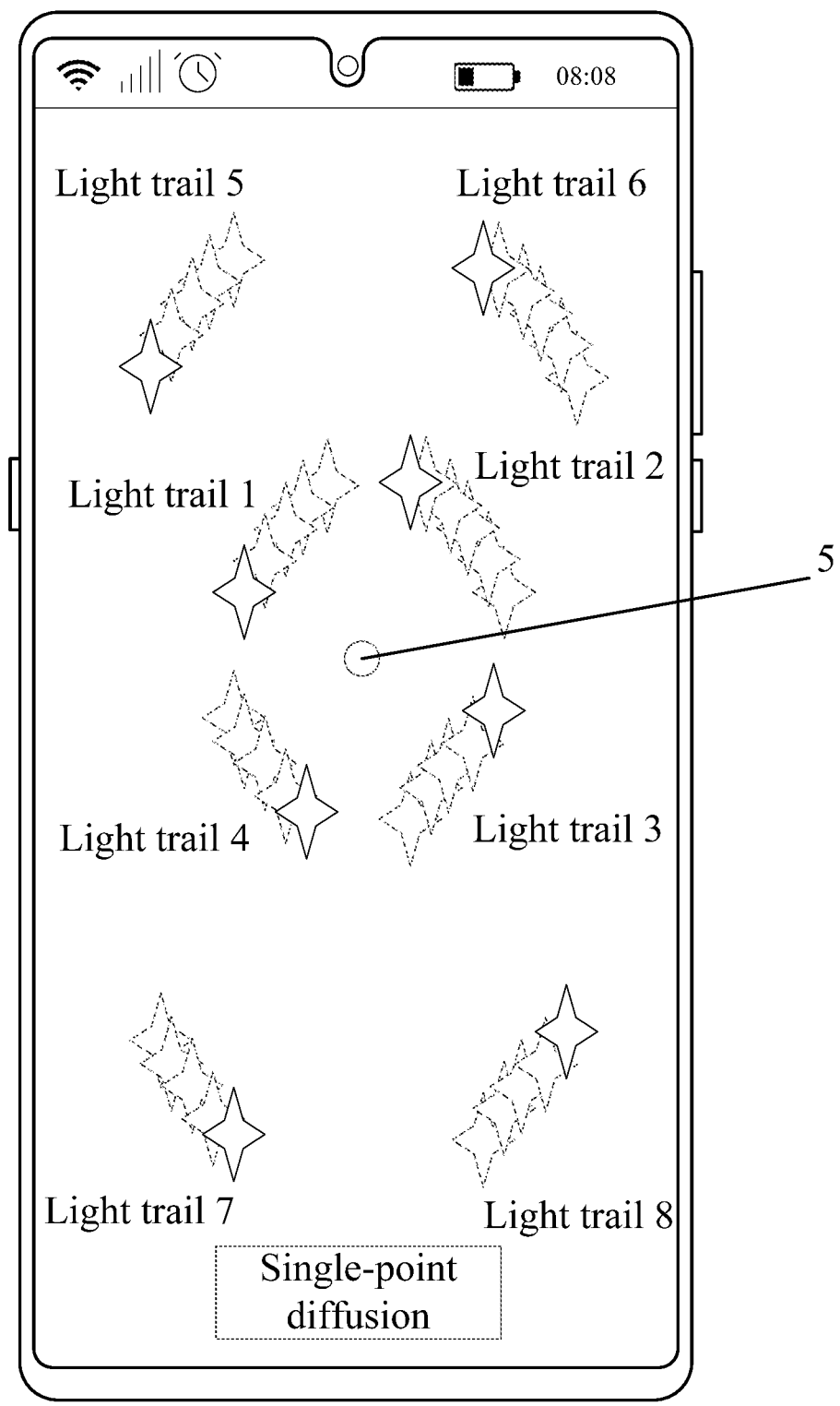
FIG. 7 is a sixth schematic diagram of an interface of a shooting control method according to an embodiment of this application.

For example, as shown in FIG. 4, when the user selects the "single-point diffusion" option, as shown in FIG. 7, in response to an input performed by the user, the electronic device controls light trails whose generation resume to be spread outward around a center point specified by the user. If the user does not select any second control, the electronic device may control light trails to be sequentially distributed in an original order (an order of appearance time points of the light trails).

In some embodiments, the at least one second control is added, and the user may select a corresponding second control based on a requirement of the user, so that light trails whose generation resume are distributed based on the requirement of the user, thereby increasing a shooting form.

In some embodiments, the first target control is a speed control in the at least one first control, the light trail generation parameter is a light trail generation speed, and the speed control is used to adjust a generation speed of a light trail in a generation state. The foregoing step 204 may be implemented by the following step 204d.

Step 204d: The electronic device updates the image in the video preview window at a first frame rate within a first time period.

A start moment of the first time period is a moment at which the first input is received, an end moment of the first time period is a moment at which a target input is received, and the target input is any one of the following: an input on a control in the at least one first control, and an input of stopping shooting the target video.

The first frame rate is determined based on the first input, and the image in the video preview window is updated at a second frame rate in a case that the first input is not received, where the second frame rate is different from the first frame rate.

It can be understood that in embodiments of this application, the user adjusts a frame rate of a video through the first input on the speed control, so that a light trail generation speed can be changed. If the frame rate is reduced, the light trail generation speed is reduced; or if the frame rate is increased, the light trail generation speed is increased. In this way, a shooting form can be increased.

In some embodiments, in a case that the first frame rate is less than the second frame rate (that is, a frame rate is reduced), after the foregoing step 204d, the shooting control method provided in embodiments of this application may further include the following step 205.

Step 205: The electronic device saves a first target image.

The first target image is an image that is not updated in the video preview window within the first time period.

It can be understood that in embodiments of this application, if a frame rate is reduced, a part of a generated video clip (that is, the first target image, where a quantity of images in the first target image is not limited in embodiments of this application) cannot be displayed in the video preview window. The electronic device may first save the first target image to be used when the frame rate is subsequently increased.

Figure 8:
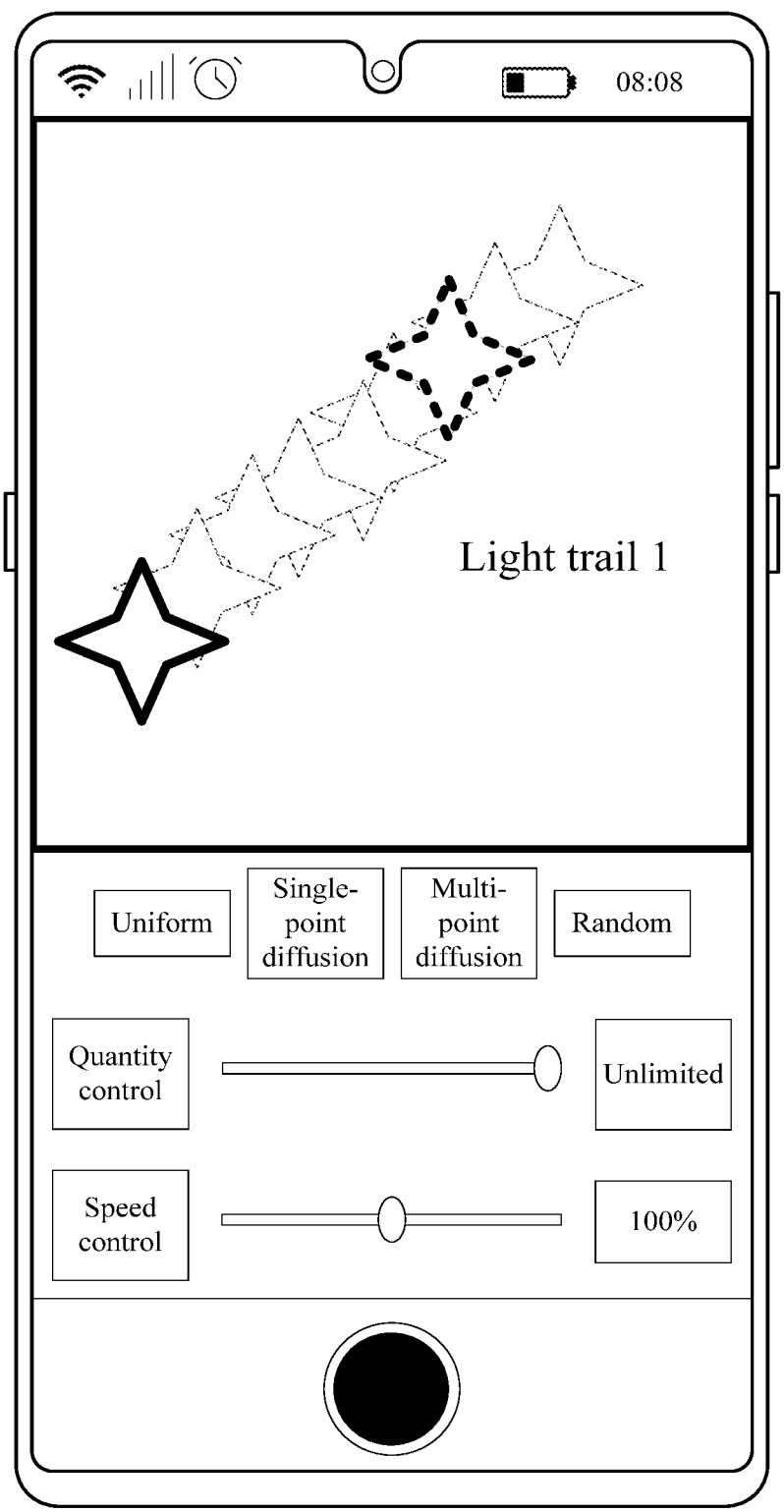
FIG. 8 is a seventh schematic diagram of an interface of a shooting control method according to an embodiment of this application.

In some embodiments, a frame rate is reduced, that is, a light trail generation speed is reduced. As shown in FIG. 8, the electronic device may save an obtained preview image, and then display the obtained preview image in the video preview window at a speed of F*(X %) frames per second, where X % is a value of the speed control specified by the user, and F frames per second are a frame rate before the first input.

In some embodiments, in a case that the first frame rate is greater than the second frame rate (that is, a frame rate is increased), before the foregoing step 204d, the shooting control method provided in embodiments of this application may further include the following step 206. The foregoing step 204d may be implemented by the following step 204d1.

Step 206: The electronic device obtains a second target image, where the second target image is an image that is not updated in the video preview window and that is saved before the first input.

Step 204d1: The electronic device updates the image in the video preview window at the first frame rate within the first time period based on the second target image and a third target image.

The third target image is an image generated within the first time period.

Figure 9:
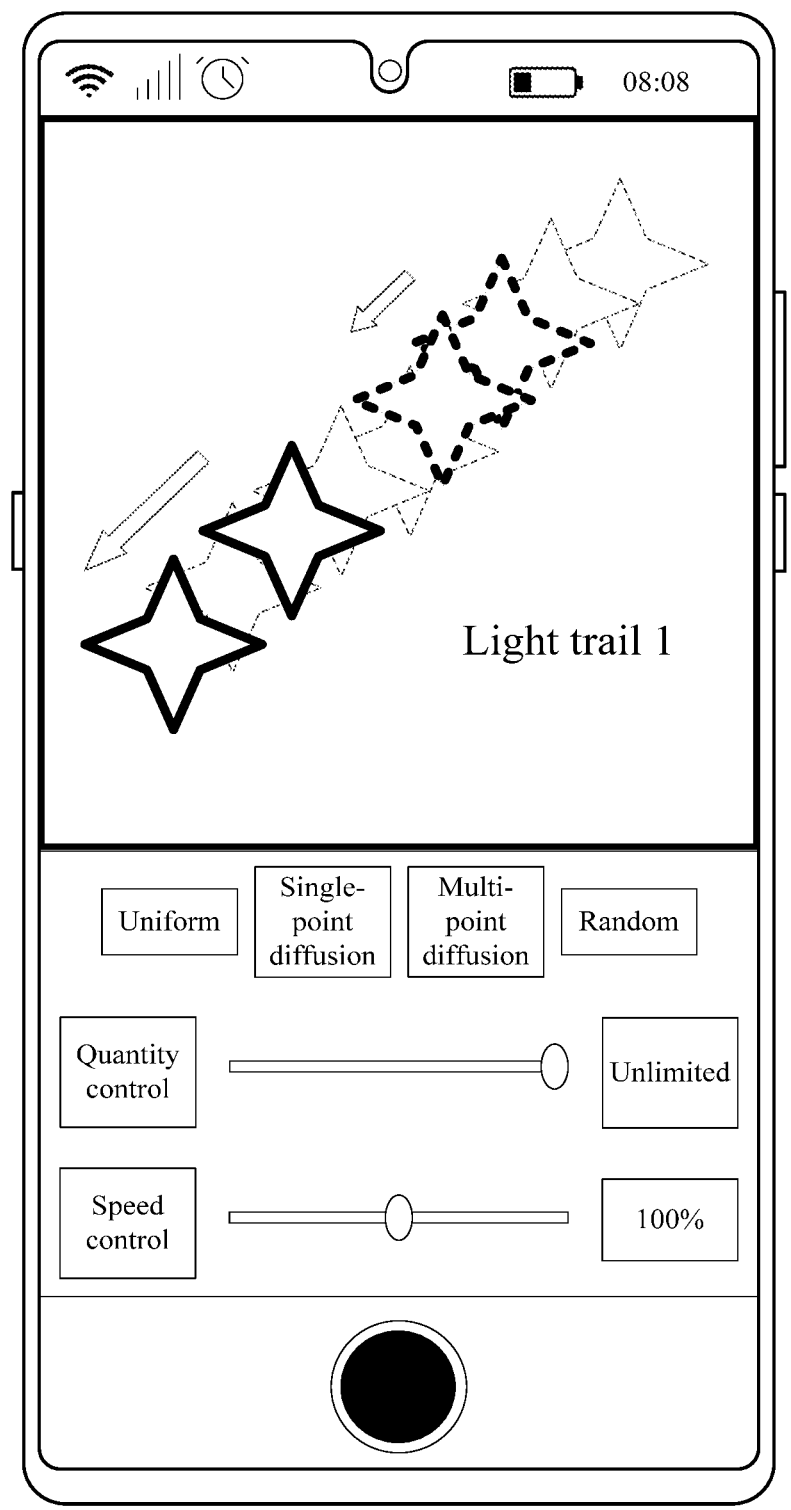
FIG. 9 is an eighth schematic diagram of an interface of a shooting control method according to an embodiment of this application.

In some embodiments, only when the user reduces a light trail generation speed through an input of reducing a rate, this step can increase the light trail generation speed by increasing the frame rate, so that the light trail generation speed is even greater than an actual generation speed (greater than F frames per second). As shown in FIG. 9, the electronic device saves a currently generated image frame by frame, and then redisplays, in the video preview window at a speed of F*(Y %) frames per second, an image that is previously buffered frame by frame, where Y % is a value of the speed control specified by the user.

In some embodiments, the user may end shooting by tapping a "stop shooting" key, and generate the target video.

The user may manually stop video recording, and the electronic device saves a recorded video locally for viewing by the user.

In some embodiments, in a process of shooting a video of a light trail generation process, in a streamer shutter video mode of a camera of the electronic device, the user may adjust a light trail generation speed through an input on the speed control, so that a light trail is delayed or accelerated to be generated.

It should be noted that the shooting control method provided in the embodiments of this application may be performed by a shooting control apparatus, or a functional module and/or a functional entity for performing the shooting control method in the shooting control apparatus. In the embodiments of this application, that the shooting control apparatus performs the shooting control method is used as an example to describe the shooting control method provided in the embodiments of this application.

Figure 10:
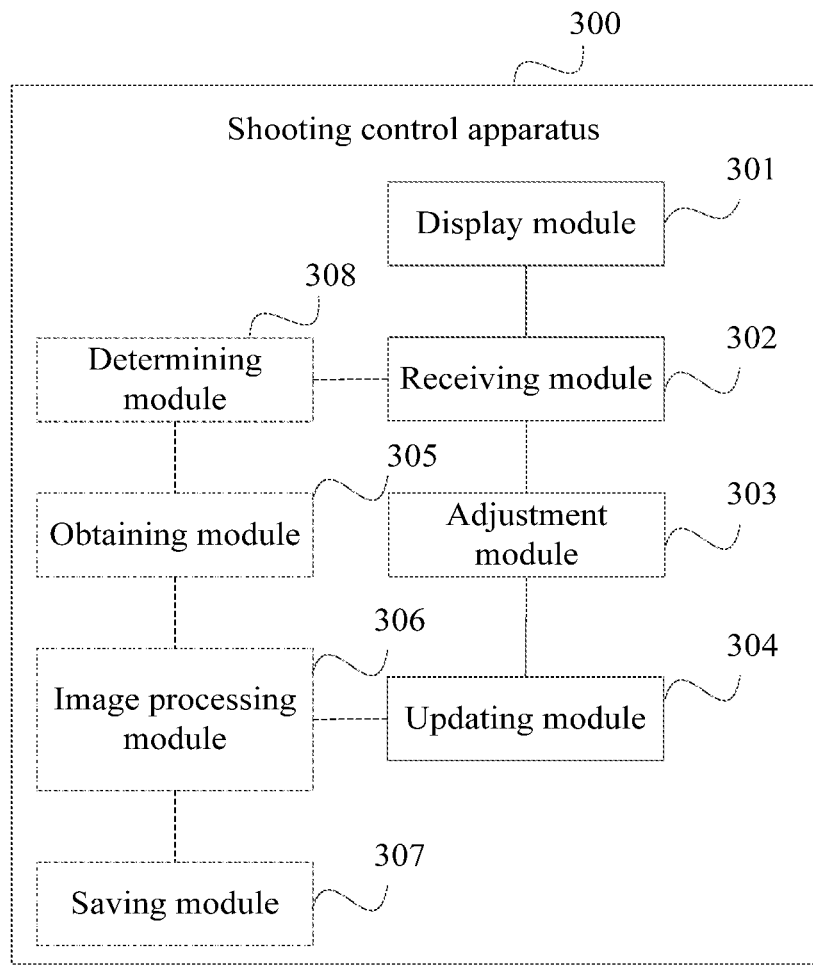
FIG. 10 is a schematic structural diagram of a shooting control apparatus according to an embodiment of this application.

FIG. 10 is a possible schematic structural diagram of a shooting control apparatus according to an embodiment of this application. As shown in FIG. 10, a shooting control apparatus 300 may include a display module 301, a receiving module 302, an adjustment module 303, and an updating module 304. The display module 301 is configured to display a first interface in a process of shooting a target video, where the target video is a video of a light trail generation process, and the first interface includes a video preview window and at least one first control. The receiving module 302 is configured to receive a first input performed by a user on a first target control, where the first target control is a control in the at least one first control. The adjustment module 303 is configured to adjust a light trail generation parameter corresponding to the first target control in response to the first input received by the receiving module. The updating module 304 is configured to update an image in the video preview window based on the adjusted light trail generation parameter.

In some embodiments, the first target control is a quantity control in the at least one first control, and the light trail generation parameter is a quantity of simultaneously generated light trails; and a first image is displayed in the video preview window before the first input; and the updating module 304 is configured to update the first image in the video preview window to a second image; and the updating module 304 is configured to update the first image in the video preview window to a third image in a case that the first input is not received, where compared with the first image, lengths of N light trails in the second image are increased, and compared with the first image, lengths of M light trails in the third image are increased, where N and M are positive integers, and N and M are different.

In some embodiments, the shooting control apparatus 300 further includes an obtaining module 305 and an image processing module 306. The obtaining module 305 is configured to obtain the third image before the updating module 304 updates the first image in the video preview window to the second image. The image processing module 306 is configured to perform target processing on the third image to obtain the second image.

In some embodiments, in a case that N is less than M, the M light trails include the N light trails, and the image processing module 306 is configured to: perform image segmentation processing on the third image to obtain a first intermediate image, where the first intermediate image is an image obtained after M−N first light trail images are segmented from the third image, and each first light trail image is an image of one light trail other than the N light trails in the M light trails; perform image segmentation processing on the first image to obtain M−N second light trail images, where each second light trail image is an image of one light trail other than the N light trails in the M light trails; and perform image composition processing on the first intermediate image and the M−N second light trail images to obtain the second image.

In some embodiments, the shooting control apparatus 300 further includes a saving module 307. The image processing module 306 is configured to perform image segmentation processing on the third image to obtain the first intermediate image and the M−N first light trail images. The saving module 307 is configured to save the M−N first light trail images.

In some embodiments, in a case that N is greater than M, the N light trails include the M light trails, and the image processing module 306 is configured to: obtain N−M third light trail images; and perform image composition processing on the third image and the N−M third light trail images to obtain the second image, where each third light trail image is a light trail image with a shortest light trail length that is in a light trail image set corresponding to one first target light trail and that is saved before the first input, and the one first target light trail is one of N−M light trails other than the M light trails in the N light trails.

In some embodiments, the shooting control apparatus 300 apparatus further includes a determining module 308. The first interface further includes at least one second control, and the receiving module 302 is further configured to: before the N−M third light trail images are obtained, receive a second input performed by a user on a second target control, where the second target control is a control in the at least one second control. The determining module 308 is configured to: in response to the second input received by the receiving module, determine that a distribution mode of the N−M third light trail images is a target mode. The obtaining module 305 is configured to obtain, N−M fourth light trail images whose distribution mode is the target mode from the K fourth light trail images as the N−M third light trail images, where each fourth light trail image is a light trail image with a shortest light trail length that is in a light trail image set corresponding to one second target light trail and that is saved before the first input, and the one second target light trail is one light trail other than the M light trails, where K is a positive integer greater than N−M.

In some embodiments, the at least one second control includes at least one of the following: a single-point diffusion distribution control, a multi-point diffusion distribution control, a uniform distribution control, and a random distribution control.

In some embodiments, the first target control is a speed control in the at least one first control, and the light trail generation parameter is a light trail generation speed. The updating module 304 is configured to: update the image in the video preview window at a first frame rate within a first time period, where a start moment of the first time period is a moment at which the first input is received, an end moment of the first time period is a moment at which a target input is received, and the target input is any one of the following: an input on a control in the at least one first control, and an input of stopping shooting the target video; and update the image in the video preview window at a second frame rate in a case that the first input is not received, where the second frame rate is different from the first frame rate.

In some embodiments, the shooting control apparatus 300 further includes a saving module 307. The saving module 307, configured to: in a case that the first frame rate is less than the second frame rate, save a first target image after the image in the video preview window is updated at the first frame rate within the first time period, where the first target image is an image that is not updated in the video preview window within the first time period.

In some embodiments, the shooting control apparatus 300 further includes an obtaining module 305. The obtaining module 305 is configured to: in a case that the first frame rate is greater than the second frame rate, obtain a second target image before the image in the video preview window is updated at the first frame rate within the first time period, where the second target image is an image that is not updated in the video preview window and that is saved before the first input. The updating module 304 is configured to update the image in the video preview window at the first frame rate within the first time period based on the second target image and a third target image, where the third target image is an image generated within the first time period.

It should be noted that, as shown in FIG. 10, modules certainly included in the shooting control apparatus 300 are shown in a solid line box, such as the display module 301, the receiving module 302, the adjustment module 303, and the updating module 304; and modules that may be included or may not be included in the shooting control apparatus 300 are shown in a dotted line box, such as the obtaining module 305, the image processing module 306, the saving module 307, and the determining module 308.

According to the shooting control apparatus provided in embodiments of this application, a first interface may be displayed in a process of shooting a target video, where the target video is a video of a light trail generation process, and the first interface includes a video preview window and at least one first control; a first input performed by a user on a first target control is received, where the first target control is a control in the at least one first control; and a light trail generation parameter corresponding to the first target control is adjusted in response to the first input, and an image in the video preview window is updated based on the adjusted light trail generation parameter. In this solution, in the process of shooting the video of the light trail generation process, the user may adjust the light trail generation parameter through the first input on the first target control (a control in the at least one first control, where each first control is used to adjust a light trail generation parameter), and update the image in the video preview window. In this way, in a shooting process, the user can change a generation parameter (that is, adjust a shooting form) in a light trail generation process through an input, so that shooting forms are diversified, and a problem that a shooting form is single because a light trail generation parameter is fixed in the related art can be resolved.

The shooting control apparatus in embodiments of this application may be an apparatus, or may be an electronic device or a component, an integrated circuit, or a chip in the electronic device. The electronic device may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in embodiments of this application.

The shooting control apparatus in embodiments of this application may be an apparatus with an operating system. The operating system may be an Android operating system, an iOS operating system, or another possible operating system. This is not specifically limited in the embodiments of this application.

The shooting control apparatus provided in embodiments of this application can implement the processes implemented in the method embodiments in FIG. 1 to FIG. 9, and can achieve a same technical effect. To avoid repetition, details are not described herein again.

Figure 11:
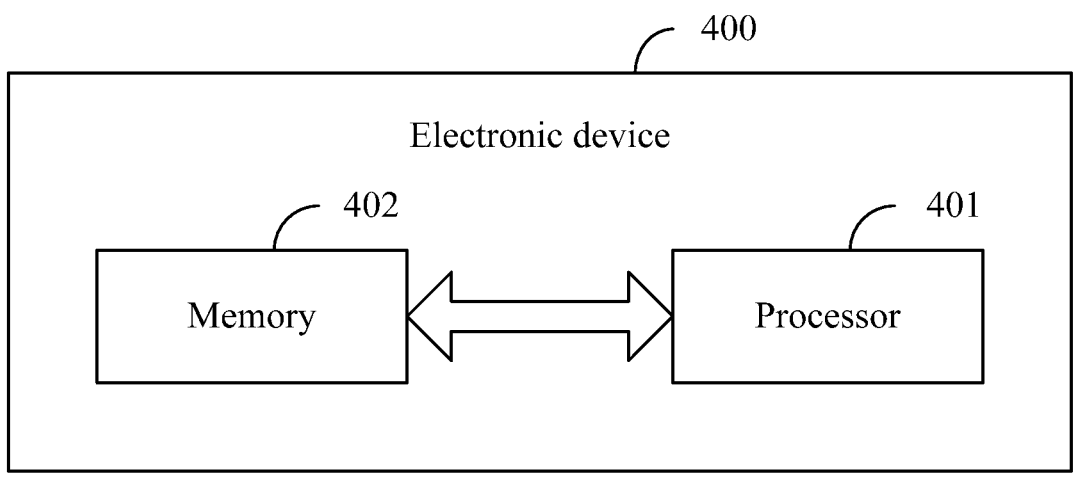
FIG. 11 is a schematic structural diagram of an electronic device according to an embodiment of this application.

As shown in FIG. 11, an embodiment of this application further provides an electronic device 400, including a processor 401, a memory 402, and a program or an instruction that is stored in the memory 402 and that can be run on the processor 401. When the program or the instruction is executed by the processor 401, the processes of the foregoing shooting control method embodiment are implemented and a same technical effect can be achieved. To avoid repetition, details are not described herein again.

It should be noted that the electronic device in embodiments of this application includes the foregoing mobile electronic device and the foregoing non-mobile electronic device.

Figure 12:
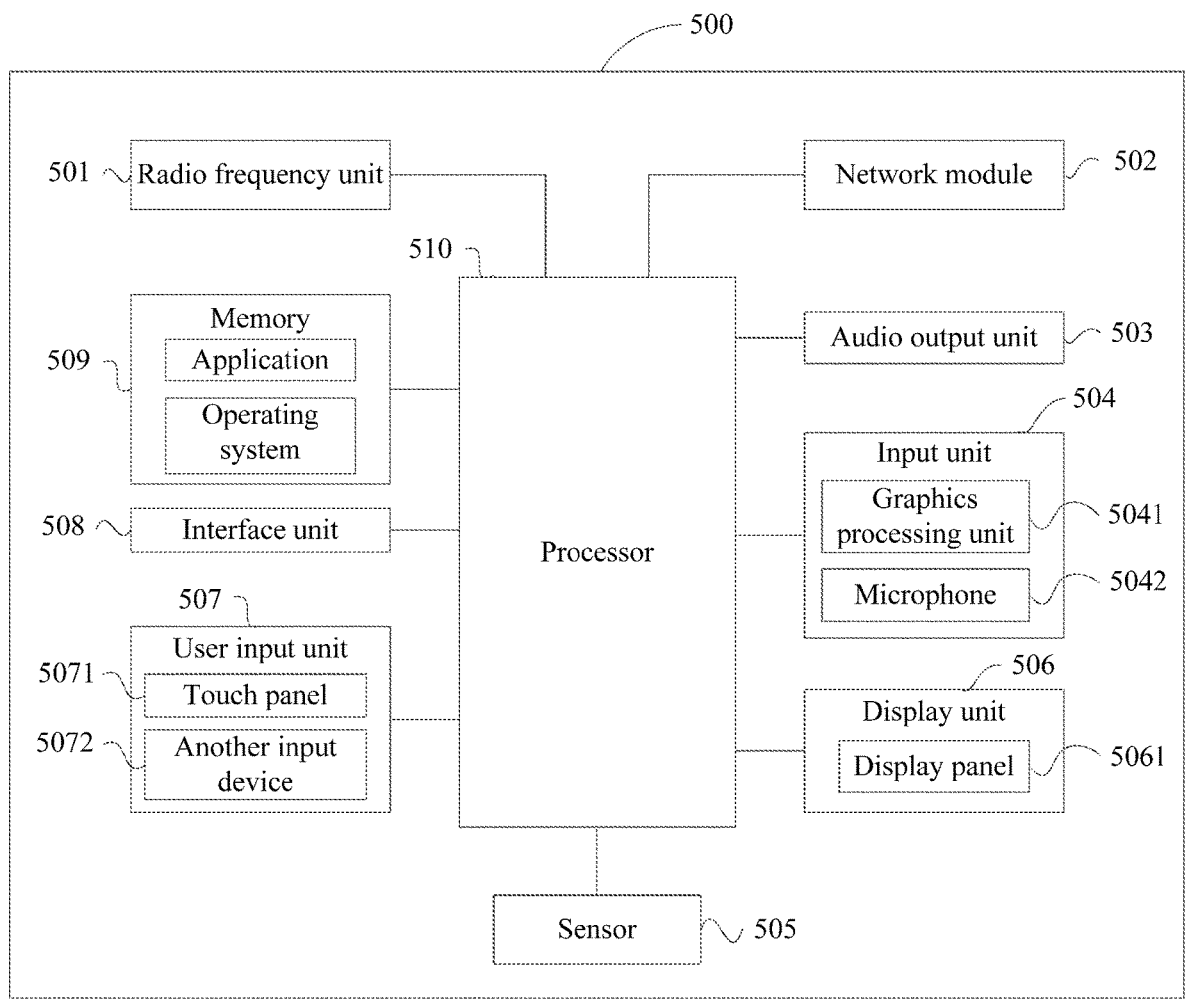
FIG. 12 is a schematic structural diagram of hardware of an electronic device according to an embodiment of this application.

FIG. 12 is a schematic structural diagram of hardware of an electronic device according to an embodiment of this application. An electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the electronic device 500 may further include a power supply (for example, a battery) that supplies power to each component. The power supply may be logically connected to the processor 510 by using a power supply management system, to implement functions such as charging and discharging management, and power consumption management by using the power supply management system. The structure of the electronic device shown in FIG. 12 does not constitute a limitation on the electronic device. The electronic device may include components more or fewer than those shown in the diagram, a combination of some components, or different component arrangements. Details are not described herein.

The display unit 506 is configured to display a first interface in a process of shooting a target video, where the target video is a video of a light trail generation process, and the first interface includes a video preview window and at least one first control. The user input unit 507 is configured to receive a first input performed by a user on a first target control, where the first target control is a control in the at least one first control. The processor 510 is configured to: adjust a light trail generation parameter corresponding to the first target control in response to the first input, and update an image in the video preview window based on the adjusted light trail generation parameter.

In some embodiments, the first target control is a quantity control in the at least one first control, and the light trail generation parameter is a quantity of simultaneously generated light trails; and a first image is displayed in the video preview window before the first input; and the processor 510 is configured to update the first image in the video preview window to a second image; and the processor 510 is configured to update the first image in the video preview window to a third image in a case that the first input is not received, where compared with the first image, lengths of N light trails in the second image are increased, and compared with the first image, lengths of M light trails in the third image are increased, where N and M are positive integers, and N and M are different.

In some embodiments, the processor 510 is further configured to: obtain the third image before the first image in the video preview window is updated to the second image, and perform target processing on the third image to obtain the second image.

In some embodiments, in a case that N is less than M, the M light trails include the N light trails, and the processor 510 is configured to: perform image segmentation processing on the third image to obtain a first intermediate image, where the first intermediate image is an image obtained after M–N first light trail images are segmented from the third image, and each first light trail image is an image of one light trail other than the N light trails in the M light trails; perform image segmentation processing on the first image to obtain M–N second light trail images, where each second light trail image is an image of one light trail other than the N light trails in the M light trails; and perform image composition processing on the first intermediate image and the M–N second light trail images to obtain the second image.

In some embodiments, the processor 510 is configured to perform image segmentation processing on the third image to obtain the first intermediate image and the M–N first light trail images; and is further configured to save the M–N first light trail images.

In some embodiments, in a case that N is greater than M, the N light trails include the M light trails, and the processor 510 is configured to: obtain N–M third light trail images; and perform image composition processing on the third image and the N–M third light trail images to obtain the second image, where each third light trail image is a light trail image with a shortest light trail length that is in a light trail image set corresponding to one first target light trail and that is saved before the first input, and the one first target light trail is one of N–M light trails other than the M light trails in the N light trails.

In some embodiments, the first interface further includes at least one second control, and the user input unit 507 is further configured to: before the N–M third light trail images are obtained, receive a second input performed by a user on a second target control, where the second target control is a control in the at least one second control. The processor 510 is further configured to: in response to the second input, determine that a distribution mode of the N–M third light trail images is a target mode. The processor 510 is configured to obtain, N–M fourth light trail images whose distribution mode is the target mode from the K fourth light trail images as the N–M third light trail images, where each fourth light trail image is a light trail image with a shortest light trail length that is in a light trail image set corresponding to one second target light trail and that is saved before the first input, and the one second target light trail is one light trail other than the M light trails, where K is a positive integer greater than N–M.

In some embodiments, the at least one second control includes at least one of the following: a single-point diffusion distribution control, a multi-point diffusion distribution control, a uniform distribution control, and a random distribution control.

In some embodiments, the first target control is a speed control in the at least one first control, and the light trail generation parameter is a light trail generation speed. The processor 510 is configured to: update the image in the video preview window at a first frame rate within a first time period, where a start moment of the first time period is a moment at which the first input is received, an end moment of the first time period is a moment at which a target input is received, and the target input is any one of the following: an input on a control in the at least one first control, and an input of stopping shooting the target video; and update the image in the video preview window at a second frame rate in a case that the first input is not received, where the second frame rate is different from the first frame rate.

In some embodiments, the processor 510 is further configured to: in a case that the first frame rate is less than the second frame rate, save a first target image after the image in the video preview window is updated at the first frame rate within the first time period, where the first target image is an image that is not updated in the video preview window within the first time period.

In some embodiments, the processor 510 is further configured to: in a case that the first frame rate is greater than the second frame rate, obtain a second target image before the image in the video preview window is updated at the first frame rate within the first time period, where the second target image is an image that is not updated in the video preview window and that is saved before the first input; and is further configured to update the image in the video preview window at the first frame rate within the first time period based on the second target image and a third target image, where the third target image is an image generated within the first time period.

According to the electronic device provided in embodiments of this application, a first interface may be displayed in a process of shooting a target video, where the target video is a video of a light trail generation process, and the first interface includes a video preview window and at least one first control; a first input performed by a user on a first target control is received, where the first target control is a control in the at least one first control; and a light trail generation parameter corresponding to the first target control is adjusted in response to the first input, and an image in the video preview window is updated based on the adjusted light trail generation parameter. In this solution, in the process of shooting the video of the light trail generation process, the user may adjust the light trail generation parameter through the first input on the first target control (a control in the at least one first control, where each first control is used to adjust a light trail generation parameter), and update the image in the video preview window. In this way, in a shooting process, the user can change a generation parameter (that is, adjust a shooting form) in a light trail generation process through an input, so that shooting forms are diversified, and a problem that a shooting form is single because a light trail generation parameter is fixed in the related art can be resolved.

It should be understood that, in embodiments of this application, the radio frequency unit 501 may be configured to receive and send information or a signal in a call process. In some embodiments, after receiving downlink data from a base station, the radio frequency unit 501 sends the downlink data to the processor 510 for processing. In addition, the radio frequency unit 501 sends uplink data to the base station. In addition, the radio frequency unit 501 may communicate with a network and another device through a wireless communication system. The electronic device provides wireless broadband Internet access for the user by using the network module 502, for example, helping the user to send and receive an e-mail, brows a web page, and access streaming media. The audio output unit 503 may convert audio data received by the radio frequency unit 501 or the network module 502 or stored in the memory 509 into an audio signal and output the audio signal as a sound. In addition, the audio output unit 503 may further provide an audio output (for example, a call signal received voice, or a message received voice) related to a specific function implemented by the electronic device 500. The input unit 504 may include a graphics processing unit (GPU) 5041 and a microphone 5042, and the graphics processing unit 5041 processes image data of a still picture or video obtained by an image capture apparatus (such as a camera) in a video capture mode or an image capture mode. The display unit 506 may include a display panel 5061. In some embodiments, the display panel 5061 may be configured in a form such as a liquid crystal display or an organic light-emitting diode. The user input unit 507 includes a touch panel 5071 and another input device 5072. The touch panel 5071 is also referred to as a touchscreen. The touch panel 5071 may include two parts: a touch detection apparatus and a touch controller. The another input device 5072 may include but is not limited to a physical keyboard, a functional button (such as a volume control button or a power on/off button), a trackball, a mouse, and a joystick. Details are not described herein. The memory 509 may be configured to store a software program and various data, including but not limited to an application and an operating system. An application processor and a modem processor may be integrated into the processor 510, the application processor mainly processes an operating system, a user interface, an application, and the like, and the modem processor mainly processes wireless communication. It can be understood that, the modem processor may not be integrated into the processor 510.

An embodiment of this application further provides a readable storage medium. The readable storage medium stores a program or an instruction, and when the program or the instruction is executed by a processor, the processes of the foregoing shooting control method embodiment are implemented and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing shooting control method embodiment, and a same technical effect can be achieved. To avoid repetition, details are not described herein again.

It should be understood that the chip mentioned in embodiments of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A shooting control method, comprising:
   displaying a first interface in a process of shooting a target video, wherein the target video is a video of a light trail generation process, and the first interface comprises a video preview window and at least one first control;
   receiving a first input on a first target control, wherein the first target control is a control in the at least one first control; and
   adjusting a light trail generation parameter corresponding to the first target control in response to the first input, and updating an image in the video preview window based on the adjusted light trail generation parameter, wherein the light trail generation parameter comprises at least one of a quantity of simultaneously generated light trails or a light trail generation speed.

2. The shooting control method according to claim 1, wherein the first target control is a quantity control in the at least one first control, and the light trail generation parameter is the quantity of simultaneously generated light trails; and a first image is displayed in the video preview window before the first input is received; and
   updating the image in the video preview window based on the adjusted light trail generation parameter comprises:
      updating the first image in the video preview window to a second image; and
      updating the first image in the video preview window to a third image when the first input is not received, wherein compared with the first image, lengths of N light trails in the second image are increased, and compared with the first image, lengths of M light trails in the third image are increased, wherein N and M are positive integers, and N and M are different.

3. The shooting control method according to claim 2, wherein before updating the first image in the video preview window to the second image, further comprising:
   obtaining the third image, and performing target processing on the third image to obtain the second image.

4. The shooting control method according to claim 3, wherein when N is less than M, the M light trails comprise the N light trails, and performing the target processing on the third image to obtain the second image comprises:
   performing image segmentation processing on the third image to obtain a first intermediate image, wherein the first intermediate image is an image obtained after M−N first light trail images are segmented from the third image, and each first light trail image is an image of one light trail other than the N light trails in the M light trails;
   performing image segmentation processing on the first image to obtain M−N second light trail images, wherein each second light trail image is an image of one light trail other than the N light trails in the M light trails; and
   performing image composition processing on the first intermediate image and the M−N second light trail images to obtain the second image.

5. The shooting control method according to claim 3, wherein when N is greater than M, the N light trails comprise the M light trails, and performing the target processing on the third image to obtain the second image comprises:
   obtaining N−M third light trail images; and
   performing image composition processing on the third image and the N−M third light trail images to obtain the second image,
   wherein each third light trail image is a light trail image with a shortest light trail length that is in a light trail image set corresponding to one first target light trail and that is saved before the first input, and the one first target light trail is one of N−M light trails other than the M light trails in the N light trails.

6. The shooting control method according to claim 5, wherein the first interface further comprises at least one second control, and before obtaining the N−M third light trail images, the method further comprises:
   receiving a second input performed by a user on a second target control, wherein the second target control is a control in the at least one second control; and
   in response to the second input, determining that a distribution mode of the N−M third light trail images is a target mode; and
   obtaining the N−M third light trail images comprises:
      obtaining N−M fourth light trail images whose distribution mode is the target mode from the K fourth light trail images as the N−M third light trail images, wherein each fourth light trail image is a light trail image with a shortest light trail length that is in a light trail image set corresponding to a second target light trail and that is saved before the first input, and the second target light trail is one light trail other than the M light trails, wherein K is a positive integer greater than N−M.

7. The shooting control method according to claim 6, wherein the at least one second control comprises at least one of the following:
   a single-point diffusion distribution control, a multi-point diffusion distribution control, a uniform distribution control, or a random distribution control.

8. The shooting control method according to claim 1, wherein the first target control is a speed control in the at least one first control, and the light trail generation parameter is the light trail generation speed; and updating the image in the video preview window based on the adjusted light trail generation parameter comprises:

updating the image in the video preview window at a first frame rate within a first time period, wherein a start moment of the first time period is a moment at which the first input is received, an end moment of the first time period is a moment at which a target input is received, and the target input is any one of the following: an input on a control in the at least one first control, or an input of stopping shooting the target video; and updating the image in the video preview window at a second frame rate when the first input is not received, wherein the second frame rate is different from the first frame rate.

9. The shooting control method according to claim 8, wherein when the first frame rate is less than the second frame rate, after updating the image in the video preview window at the first frame rate within the first time period, the method further comprises:

saving a first target image, wherein the first target image is an image that is not updated in the video preview window within the first time period.

10. The shooting control method according to claim 8, wherein when the first frame rate is greater than the second frame rate, before updating the image in the video preview window at the first frame rate within the first time period, the method further comprises:

obtaining a second target image, wherein the second target image is an image that is not updated in the video preview window and that is saved before the first input; and updating the image in the video preview window at the first frame rate within the first time period comprises:

updating the image in the video preview window at the first frame rate within the first time period based on the second target image and a third target image, wherein the third target image is an image generated within the first time period.

11. An electronic device, comprising a processor and a memory storing a program or an instruction that is capable of running on the processor, wherein the program or the instruction, when executed by the processor, causes the electronic device to perform:

displaying a first interface in a process of shooting a target video, wherein the target video is a video of a light trail generation process, and the first interface comprises a video preview window and at least one first control;

receiving a first input on a first target control, wherein the first target control is a control in the at least one first control; and adjusting a light trail generation parameter corresponding to the first target control in response to the first input, and updating an image in the video preview window based on the adjusted light trail generation parameter, wherein the light trail generation parameter comprises at least one of a quantity of simultaneously generated light trails or a light trail generation speed.

12. The electronic device according to claim 11, wherein the first target control is a quantity control in the at least one first control, and the light trail generation parameter is the quantity of simultaneously generated light trails; and a first image is displayed in the video preview window before the first input is received; and updating the image in the video preview window based on the adjusted light trail generation parameter comprises:

updating the first image in the video preview window to a second image; and updating the first image in the video preview window to a third image when the first input is not received, wherein compared with the first image, lengths of N light trails in the second image are increased, and compared with the first image, lengths of M light trails in the third image are increased, wherein N and M are positive integers, and N and M are different.

13. The electronic device according to claim 12, wherein before updating the first image in the video preview window to the second image, the program or the instruction, when executed by the processor, causes the electronic device to further perform:

obtaining the third image, and performing target processing on the third image to obtain the second image.

14. The electronic device according to claim 13, wherein when N is less than M, the M light trails comprise the N light trails, and performing the target processing on the third image to obtain the second image comprises:

performing image segmentation processing on the third image to obtain a first intermediate image, wherein the first intermediate image is an image obtained after M–N first light trail images are segmented from the third image, and each first light trail image is an image of one light trail other than the N light trails in the M light trails;

performing image segmentation processing on the first image to obtain M–N second light trail images, wherein each second light trail image is an image of one light trail other than the N light trails in the M light trails; and performing image composition processing on the first intermediate image and the M–N second light trail images to obtain the second image.

15. The electronic device according to claim 13, wherein when N is greater than M, the N light trails comprise the M light trails, and performing the target processing on the third image to obtain the second image comprises:

obtaining N–M third light trail images; and performing image composition processing on the third image and the N–M third light trail images to obtain the second image, wherein each third light trail image is a light trail image with a shortest light trail length that is in a light trail image set corresponding to one first target light trail and that is saved before the first input, and the one first target light trail is one of N–M light trails other than the M light trails in the N light trails.

16. The electronic device according to claim 15, wherein the first interface further comprises at least one second control, and before obtaining the N–M third light trail images, the program or the instruction, when executed by the processor, causes the electronic device to further perform:

receiving a second input performed by a user on a second target control, wherein the second target control is a control in the at least one second control; and in response to the second input, determining that a distribution mode of the N–M third light trail images is a target mode; and obtaining the N–M third light trail images comprises:

obtaining N–M fourth light trail images whose distribution mode is the target mode from the K fourth light trail images as the N–M third light trail images, wherein each fourth light trail image is a light trail image with a shortest light trail length that is in a light trail image set corresponding to a second target light trail and that is saved before the first input, and the second target light trail is one light trail other than the M light trails, wherein K is a positive integer greater than N−M.

17. The electronic device according to claim 16, wherein the at least one second control comprises at least one of the following:

a single-point diffusion distribution control, a multi-point diffusion distribution control, a uniform distribution control, or a random distribution control.

18. The electronic device according to claim 11, wherein the first target control is a speed control in the at least one first control, and the light trail generation parameter is the light trail generation speed; and updating the image in the video preview window based on the adjusted light trail generation parameter comprises:

updating the image in the video preview window at a first frame rate within a first time period, wherein a start moment of the first time period is a moment at which the first input is received, an end moment of the first time period is a moment at which a target input is received, and the target input is any one of the following: an input on a control in the at least one first control, or an input of stopping shooting the target video; and updating the image in the video preview window at a second frame rate when the first input is not received, wherein the second frame rate is different from the first frame rate.

19. The electronic device according to claim 18, wherein when the first frame rate is less than the second frame rate, after updating the image in the video preview window at the first frame rate within the first time period, the program or the instruction, when executed by the processor, causes the electronic device to further perform:

saving a first target image, wherein the first target image is an image that is not updated in the video preview window within the first time period.

20. The electronic device according to claim 18, wherein when the first frame rate is greater than the second frame rate, before updating the image in the video preview window at the first frame rate within the first time period, the program or the instruction, when executed by the processor, causes the electronic device to further perform:

obtaining a second target image, wherein the second target image is an image that is not updated in the video preview window and that is saved before the first input; and updating the image in the video preview window at the first frame rate within the first time period comprises:

updating the image in the video preview window at the first frame rate within the first time period based on the second target image and a third target image, wherein the third target image is an image generated within the first time period.

* * * * *